Jan. 16, 1923.

M. P. BREON.
TIRE REMOVER.
FILED JULY 26, 1921.

Jan. 16, 1923.
M. P. BREON.
TIRE REMOVER.
FILED JULY 26, 1921.
1,442,519
3 SHEETS-SHEET 3
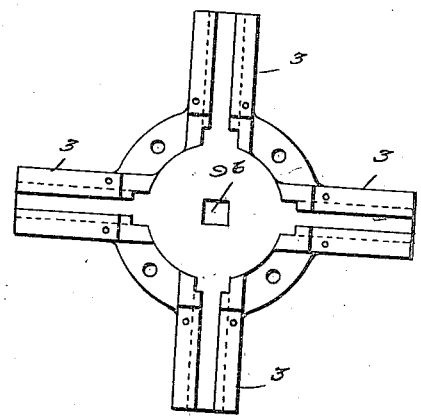
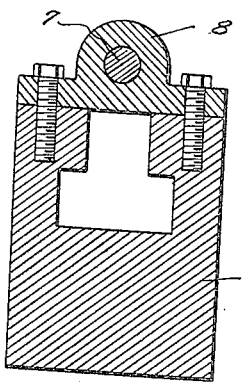
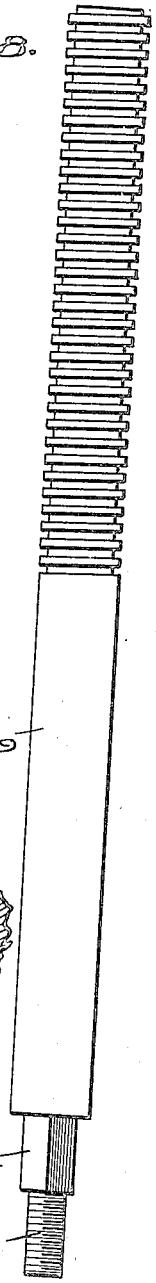
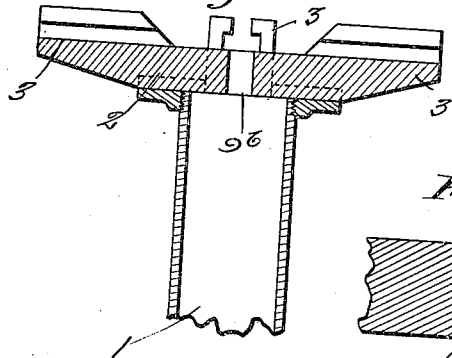
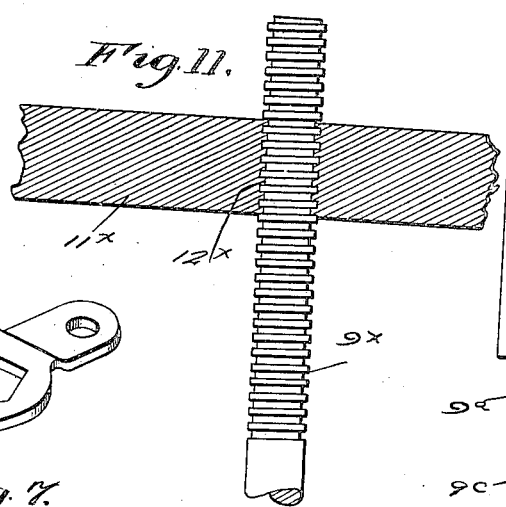
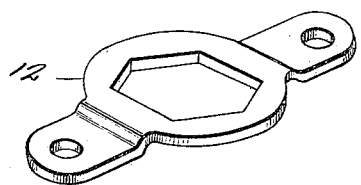
M. P. Breon
INVENTOR
BY Victor J. Evans
ATTORNEY
WITNESSES Patented Jan. 16, 1923.

1,442,519

UNITED STATES PATENT OFFICE.

MAURICE PETER BREON, OF NEWPORT NEWS, VIRGINIA, ASSIGNOR TO CORA L. BREON, OF NEWPORT NEWS, VIRGINIA.

TIRE REMOVER.

Application filed July 26, 1921. Serial No. 487,642.

*To all whom it may concern:*

Be it known that I, MAURICE P. BREON, a citizen of the United States, residing at Newport News, in the county of Warwick and State of Virginia, have invented new and useful Improvements in Tire Removers, of which the following is a specification.

My invention relates to improvements in tire removing machines and one object is the provision of a machine which can be instantly adapted to its work and which will remove the tire in a very short time.

Another object of my invention is the provision of a mechanism of the character stated which will operate with ease and facility and which will exert an even or balanced pressure upon the outer surface of the tire.

Another object of my invention is the provision of a tire removing machine which will be of compact construction to occupy a small amount of space, which will be strong and durable; inexpensive to produce, and which generally will prove thoroughly efficient and practical.

To accomplish the objects stated my invention broadly stated consists of a supporting base, rim clamping means attached to said base, a rigid shaft rising from said base, a pressure element rotatable on said shaft and vertically adjustable by said rotation and a series of revolving tire pressure members carried by said pressure element to bear upon the tire and distributed to exert a balanced pressure upon the tire.

The invention further consists of a tire removing machine embodying novel features of construction and combination of parts for service, substantially as described and claimed and as illustrated in the drawings in which:—

In the accompanying drawings, forming part of this specification:—

Figures 3 to 10 are detail views of parts of the apparatus hereinafter explicitly referred to.

Figure 11 is a detail section of a slight modification.

Similar numerals of reference designate corresponding parts in all of the views of the drawings.

Figure 1:
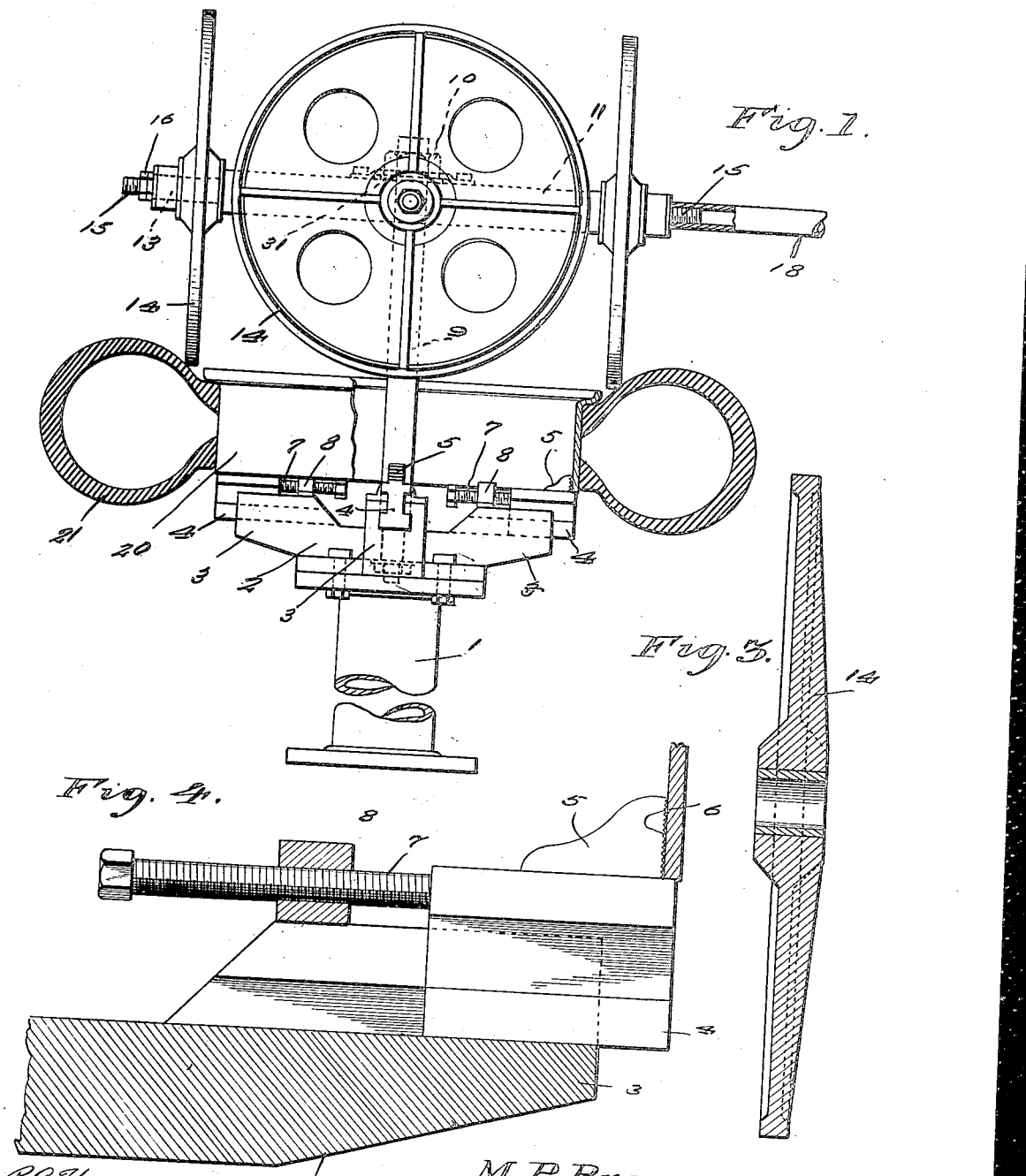
Figure 1 is a broken side elevation of the apparatus constituting the best practical embodiment of my invention of which I am cognizant, the tire being shown by dotted lines.

Among other elements my novel apparatus comprises a pedestal 1 on which is a table 2, Figures 1 and 10. The said table 2 comprises by preference four equi-distant radial arms 3, and held against vertical movement in the said arms 3 are radially slidable jaws 4 on which are upstanding projections 5, the faces or outer ends of which are toothed as indicated by 6. In conjunction with each of the jaws 4 is employed a radially disposed screw 7 which bears at 8 in the table 2 between the center of the table and the back end of the jaw. Manifestly by manipulating the screws 7 the jaws may be adjusted so as to strongly hold rims of various diameters.

Figure 2:
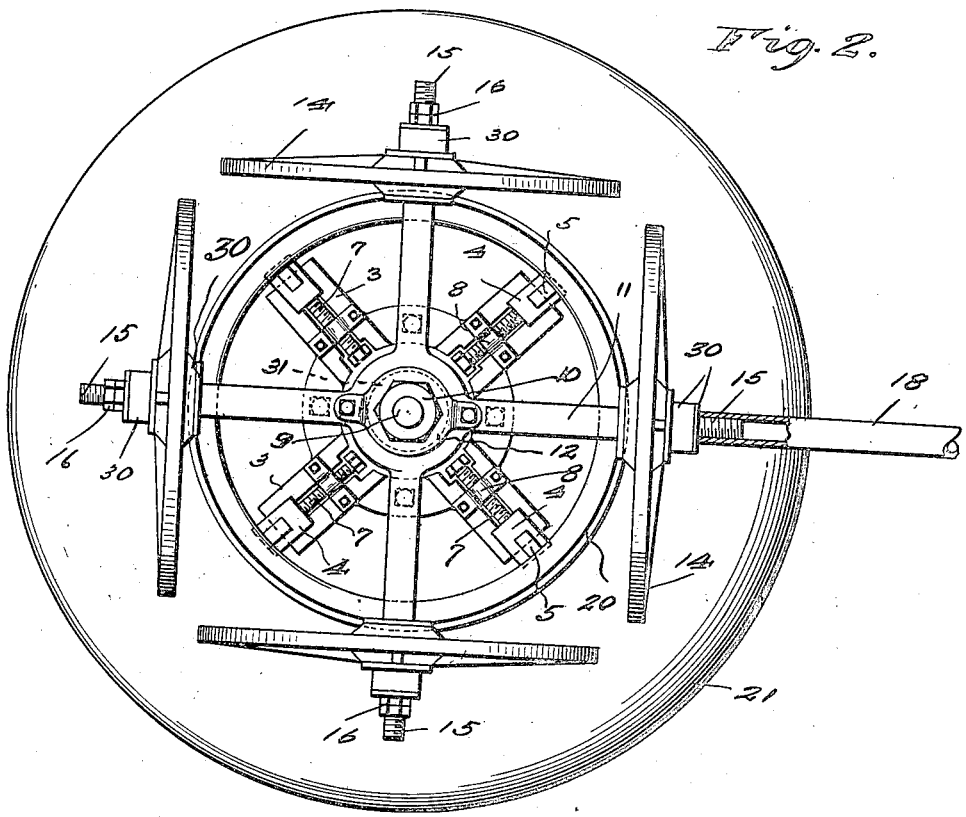
Figure 2 is a plan view of the apparatus.
Figure 6:
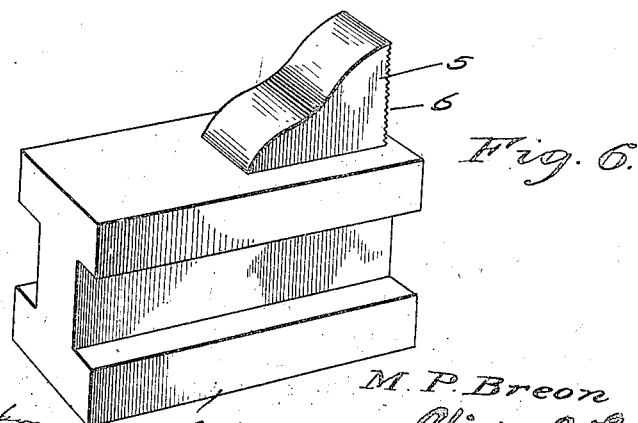

In addition to the elements named my novel apparatus comprises a central upright shaft 9, a deep nut 10 on the upper end of said shaft, a wheel spider 11, and a nut lock, shown in Figures 1 and 2; the said nut lock comprising a plate 12 snugly fitted over the nut 10 and fastened to the spider 11. The several arms of the spider 11 terminate in spindle portions 13 for the rotatable mounting of pressure wheels 14, and the said spindles 13 terminate, in turn, in reduced and threaded portions 15 for the reception of nuts 16 the function of which is to confine or retain the wheels 14 on the spindles 13. It will also be observed by particular reference to Figures 1 and 2 that the outer end of one or more of the spider arms is utilized for the connection of one or more operating handles or levers 18 which are partly or wholly tubular as illustrated.

A rim is shown in Figure 1 and designated by 20, while a tire on the rim is designated in the same figure as 21. The rim may be separable, as shown, or fixed to the wheel.

In the preferred embodiment of my invention the upright shaft 9 is provided with a lower portion $9^a$, of square form in cross section designed to seat in a correspondingly shaped aperture $9^b$ in the table 2; and said shaft 9 is also provided with a lower threaded portion $9^c$ to receive a securing nut and washer which latter are disposed under the table.

In the practical use of my novel apparatus the tire locks are removed from a rim, after which the said rim and the tire thereon are placed over the central shaft 9 and are arranged with the rim resting with its outside edge flush with the outer ends of the jaws 4. The rim is then made fast or fixed to the table 2 by manipulation of the bolts or screws 7. In this connection it will be manifest that the roughening of the outer faces of the jaw projections 4 may be depended upon to effectively prevent movement of the rim. Subsequently to the positioning and securing of the rim and tire in the manner described, the spider 11 is mounted on the shaft 9, and adjustment is made by the employment of washers such as indicated by 30 so that the faces of the pressure wheels 14 have the desired clearances relatively to the rim 20. The pressure wheels are then firmly positioned on the tire 21. A washer 31 is placed under the nut 10, and with an offset wrench the nut 10 is turned downwardly to a sufficient extent to cause the pressure wheels to exert considerable pressure on the tire. When with the handle or handles 18 properly applied the operator turns the spider 11 and the pressure wheels 14 through about a quarter of a revolution with the result that the displacement of the tire from the rim will be started. This operation may be and preferably is repeated until the tire has been started from the rim throughout the circumference of the rim and tire. At this time the nut locking plate 12 is placed over the nut and fastened to or engaged with the spider 11 about the central shaft, whereupon the nut 10 will travel down the threaded portion of the shaft 9 with the result that through the medium of the pressure wheels 14 the tire will be forced from the rim.

Manifestly it is within the purview of my invention to provide the spider with a threaded aperture to directly engage the thread on the central shaft. This will be better understood by reference to Figure 11 in which the central shaft is designated 9× and the spider 11× while the threaded aperture in the spider is designated 12×.

It will be apparent from the foregoing that through the medium of my novel apparatus a tire may be removed from a rim with but little effort on the part of a single operator; and that the use of pusher wheels in pairs is advantageous, as diminishing the bending action on the central spindle which would be caused by a single pusher, and as causing the tire to move on the rim at two or four points simultaneously and thus more evenly; also, that the apparatus is simple in construction and embodies no delicate parts such as are likely to get out of order after a short period of use.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

I have described the table as being horizontal and the shaft carrying the spider as being vertical, but it is understood that these positions are relative only and that the apparatus may be disposed and operated at any angle from that shown, depending on the convenience of the operator.

Having described my invention, what I claim and desire to secure by Letters Patent, is:—

1. A tire removing machine, consisting of a supporting base, rim clamping means secured to said base and comprising a series of radially disposed rim engaging units, means for adjusting said units, a shaft rising from and rigid with said base and having a screw threaded portion, a spider mounted for rotation on said rigid shaft, a series of wheels carried by the spider and engaging the tire simultaneously at equal distances around its edge, a threaded nut engaging the threads of the shaft, and a connection between the nut and spider to cause the spider and wheels to move vertically on said shaft.

2. A tire removing machine, consisting of a supporting base, rim clamping devices carried by said base, means for adjusting said clamping devices according to the size of the rim, a shaft rising from said base and rigid therewith and provided with screw threads, a spider having equally distributed radial arms rotatable upon said shaft, wheels journalled upon the ends of the arms of said spider and adjustable on said ends to accord with the size of tire to be removed, a handle for connection with one of said arms to rotate said spider, and a nut engaging the threads of said shaft and connected with said spider to cause the spider to move vertically upon said shaft to cause the wheels to force the tire from the rim.

3. A tire removing machine, consisting of a supporting base, rim clamping devices carried by said base and comprising a series of radial adjustable rim engaging members, a shaft rising from said base and rigid therewith and having a threaded portion, a nut adapted to travel on said threaded portion of the shaft, a spider rotatable on said shaft and connected to the nut to travel vertically upon said shaft and pressure wheels distributed at equal distances around the rim and adjustable on the radial arms of the spider and exerting pressure entirely around the outer surface of the tire to force it from the rim.

4. In a tire removing machine, the combination of a supporting base, rim clamping devices attached to said base, a rigid shaft rising from said base, a pressure element rotatable on said shaft and vertically adjusted by said rotation, a series of revolving tire pressure members carried by said pressure element, said pressure members being distributed at equal distances around the rim and all bearing simultaneously upon and around the inner edge of the tire to exert a balanced pressure upon the tire to force it from the rim.

In testimony whereof I affix my signature.

MAURICE PETER BREON.